US008141082B2

(12) United States Patent
Upadhyaya et al.

(10) Patent No.: US 8,141,082 B2
(45) Date of Patent: Mar. 20, 2012

(54) NODE-BASED REPRESENTATION OF MULTI-THREADED COMPUTING ENVIRONMENT TASKS, AND NODE-BASED DATA RACE EVALUATION

(75) Inventors: Gautam Upadhyaya, Lafayette, IN (US); Zhiqiang Ma, Champaign, IL (US); Paul M. Petersen, Champaign, IL (US)

(73) Assignee: Intel Corporation, Santa Clara, CA (US)

( * ) Notice: Subject to any disclaimer, the term of this patent is extended or adjusted under 35 U.S.C. 154(b) by 1027 days.

(21) Appl. No.: 12/039,528

(22) Filed: Feb. 28, 2008

(65) Prior Publication Data

US 2009/0222825 A1 Sep. 3, 2009

(51) Int. Cl.
*G06F 9/46* (2006.01)
(52) U.S. Cl. .......................................... 718/102
(58) Field of Classification Search ................. None
See application file for complete search history.

(56) References Cited

U.S. PATENT DOCUMENTS

| 6,286,130 | B1* | 9/2001 | Poulsen et al. ............... 717/119 |
|---|---|---|---|
| 6,343,371 | B1* | 1/2002 | Flanagan et al. .............. 717/124 |
| 7,673,181 | B1* | 3/2010 | Lindo et al. ................ 714/38.13 |
| 2003/0056149 | A1* | 3/2003 | Hue ................................. 714/38 |
| 2004/0255277 | A1* | 12/2004 | Berg et al. ..................... 717/124 |
| 2005/0177775 | A1* | 8/2005 | Qadeer et al. .................... 714/38 |
| 2005/0210473 | A1* | 9/2005 | Inchingolo et al. ............ 718/107 |
| 2005/0216798 | A1* | 9/2005 | Yu ................................. 714/718 |
| 2005/0283781 | A1* | 12/2005 | Karp et al. ..................... 718/100 |
| 2006/0200823 | A1* | 9/2006 | Rodeheffer et al. .......... 718/100 |
| 2007/0245312 | A1* | 10/2007 | Qadeer et al. ................. 717/124 |
| 2008/0178156 | A1* | 7/2008 | Kahlon et al. ................ 717/126 |
| 2009/0282288 | A1* | 11/2009 | Wang et al. ..................... 714/37 |

OTHER PUBLICATIONS

Banerjee et al. (Banerjee) (Unraveling Data Race Detection in the Intel Thread Checker); Presented at The First Workshop on Software Tools for Multi-core Systems (STMCS), in conjunction with IEEE/ACM International Symposium on Code Generation and Optimization (CGO), Mar. 26, 2006, Manhattan, New York, NY; 10 pages.*
Wang et al. (Dynamic Model Checking with Property Driven Pruning to Detect Race Conditions); ATVA '08 Proceedings of the 6th International Symposium on Automated Technology for Verification and Analysis; 2008, 15 pages.*
Sack et al. (Accurate and Efficient Filtering for the Intel Thread Checker Race Detector); ASID '06 Proceedings of the 1st workshop on Architectural and system support for improving software dependability; 2006; pp. 34-41.*

(Continued)

*Primary Examiner* — Keith Vicary
(74) *Attorney, Agent, or Firm* — Garrett IP, LLC (57) ABSTRACT

A method for detecting race conditions in a concurrent processing environment is provided. The method comprises implementing a data structure configured for storing data related to at least one task executed in a concurrent processing computing environment, each task represented by a node in the data structure; and assigning to a node in the data structure at least one of a task number, a wait number, and a wait list; wherein the task number uniquely identifies the respective task, wherein the wait number is calculated based on a segment number of the respective task's parent node, and wherein the wait list comprises at least an ancestor's wait number. The method may further comprise monitoring a plurality of memory locations to determine if a first task accesses a first memory location, wherein said first memory location was previously accessed by a second task.

20 Claims, 5 Drawing Sheets

OTHER PUBLICATIONS

Banerjee et al. (A Theory of Data Race Detection); PADTAD '06 Proceedings of the 2006 workshop on Parallel and distributed systems: testing and debugging; 2006; p. 69-78.*

Upadhyaya et al. (Automatic Atomic Region Identification in Shared Memory SPMD Programs); OOPSLA '10 Proceedings of the ACM international conference on Object oriented programming systems languages and applications; 2010; 19 pages.*

Upadhyaya et al. (Using Data Structure Knowledge for Efficient Lock Generation and Strong Atomicity); PPoPP '10 Proceedings of the 15th ACM SIGPLAN symposium on Principles and practice of parallel programming; 2010; pp. 281-292.*

* cited by examiner

Optimize Data Structure

NODE-BASED REPRESENTATION OF MULTI-THREADED COMPUTING ENVIRONMENT TASKS, AND NODE-BASED DATA RACE EVALUATION

COPYRIGHT & TRADEMARK NOTICES

This patent document may contain material that is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The present disclosure relates generally to computer systems and concurrent processing environments, and, more particularly, to methods and systems for detecting data race conditions in an efficient manner.

BACKGROUND

In a concurrent processing environment multiple sets of instructions, herein referred to as tasks, may be executed simultaneously. The act of starting a new task is referred to as spawning. The task which spawns the new task is called the parent, while the task being spawned is the child. A task is referred to as being alive if it is either still executing or still capable of being scheduled to execute. A task is referred to as dead if it has finished executing.

Parallel computer programs are fundamentally more difficult to validate, test, and debug than sequential computer programs. While typical programs can exhibit traditional "sequential" errors, such as those caused by incorrect syntax, program logic, control flow, or rounding or truncation of numerical results, parallel programs can exhibit additional types of errors. Parallel programming errors can result from parallelizing a sequential program, wherein constraints on the ordering of operations in the original sequential program are relaxed in order to exploit parallelism, which results in unintended indeterminacy. In addition, errors can result from the incorrect application or use of parallel programming constructs; many of these errors are difficult or impossible to detect statically, especially without employing interprocedural analysis.

Currently, it remains difficult to detect errors caused by the incorrect use of parallel programming constructs or with respect to the general problem of parallel program validation. For example, current race detection schemes employ either static, post-mortem, or on-the-fly analysis methods. Static methods suffer the disadvantage of being overly conservative since they do not resolve references that must be analyzed at runtime. Post-mortem methods require the production and storage of extremely large amounts of data in order to provide complete, accurate race analysis. And, reducing the amount of data results in correspondingly less accurate analysis. On-the-fly race analysis helps eliminate the requirement of storing large amounts of post-mortem analysis data, without sacrificing the accuracy of dynamic analysis techniques.

Most race detection schemes, however, require parallel execution of the program being analyzed. These methods typically require a particular parallel machine on which to execute the parallel program, and thus cannot analyze parallel programs with severe errors that prevent parallel execution or cause abnormal termination. Dynamic dependence analysis methods detect data races that could potentially occur during execution of a parallel program via on-the-fly analysis of the corresponding sequential program. These methods do not require parallel execution, and they isolate the analysis from particular timings or interleavings of events, scheduling methods, or numbers of processors or threads used. However, dynamic dependence analysis schemes do not detect errors arising from incorrect parallel programming construct use, and do not fully support a complete parallel programming language or dialect.

Most race detection schemes, even those employing the so-called sequential traces, are limited in several ways. First, they suffer all the disadvantages of dynamic methods that require parallel execution: the schemes are inherently less portable, and they cannot analyze parallel programs with catastrophic errors. Second, many of these schemes assume simplified parallel programming models, and most are not based on realistic, complete parallel programming languages or dialects. While these schemes address the issue of language generality, they still suffer the disadvantage of requiring parallel execution, which limits the classes of errors that can be analyzed, and the portability and applicability of the methods.

Other relative debugging techniques also suffer the disadvantages of most of the aforementioned schemes (i.e., requiring parallel execution, analyzing one particular parallel execution). Thus, some degree of parallel execution is still required. Some techniques have been developed which attempt to analyze a concurrent processing environment using sequential execution (i.e., using just one thread and projecting all of the other threads of execution of the program being debugged onto this one thread); however they tend to be very restrictive and inefficient.

Systems and methods are needed that can overcome the above-noted shortcomings.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXAMPLE EMBODIMENTS

The present invention is directed to methods and systems for validating the correctness of parallel computer programs that were written in various programming languages in order to detect errors that could cause these parallel computer programs to behave incorrectly or to produce incorrect results.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In one embodiment, a data structure may be implemented for storing data related to a plurality of tasks pending in a parallel processing environment. Each one of the tasks may be represented by a respective node in the data structure. Each node may be assigned at least one of a unique task number, a wait number, and a wait list containing at least one of an ancestor node's wait number, for example.

A plurality of memory locations in the computer system, which are accessible by the plurality of tasks, are monitored in order to determine if any one of the tasks accesses a memory location that has been previously accessed by another task. When a memory location is accessed more than once, it is determined whether the two tasks executed concurrently. If the two tasks executed concurrently, and the memory location is not protected from concurrent access (e.g., no task has a lock on the respective memory location to prevent another task from accessing the same memory location), a potential data race exists.

Desirably, the data structure is monitored and pruned to enhance systems efficiency. For example, in one embodiment, in response to determining that a task has finished execution, the respective node for the task is deleted from the data structure. And, in certain embodiments, where at least two nodes have identical wait lists, those nodes are combined into a single node.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program, when executed on a computer, causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

Figure 1:
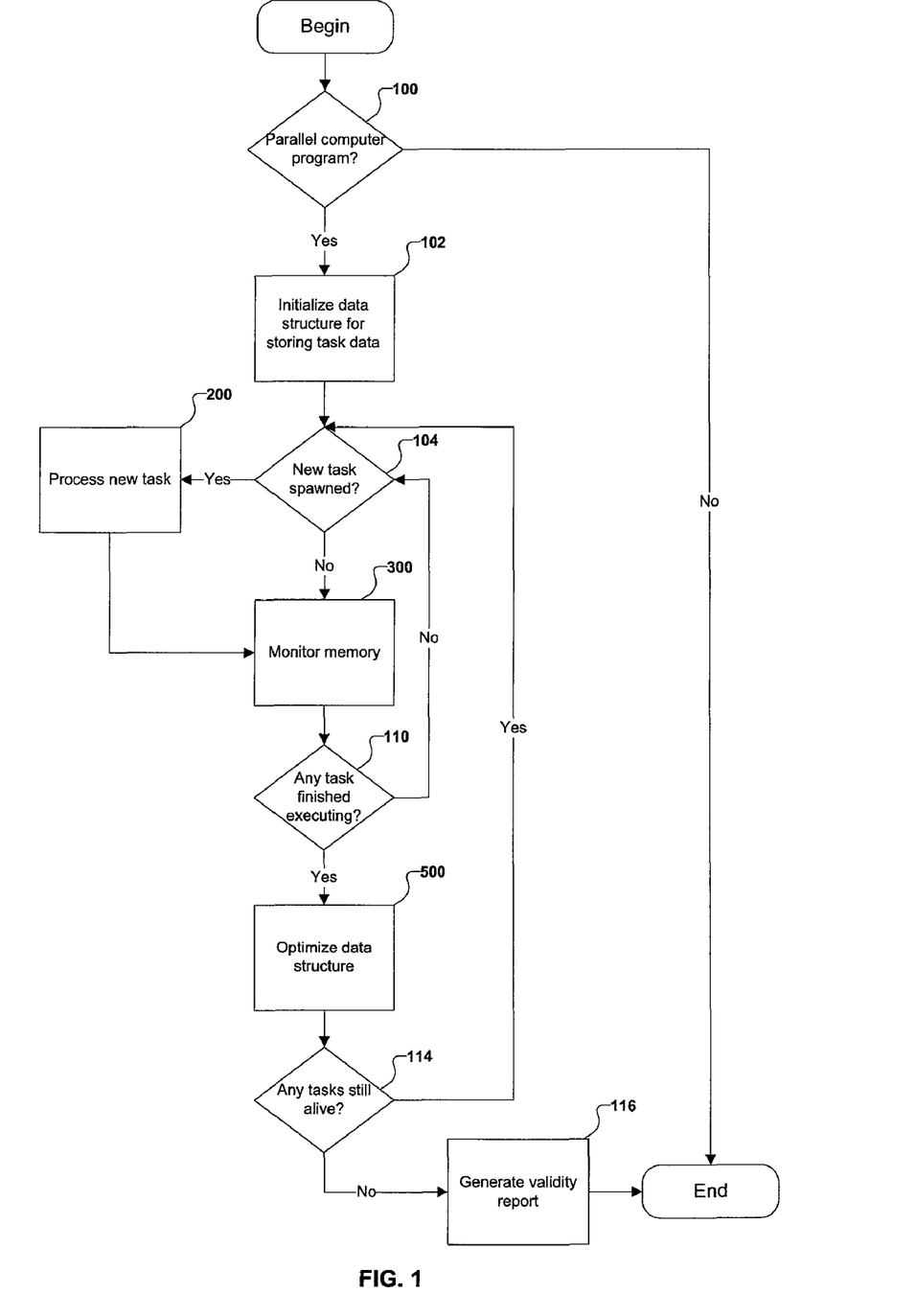
FIG. 1 is a flow diagram of a method of monitoring and detecting race conditions in a concurrent processing environment, in accordance with one embodiment.
Figure 6:
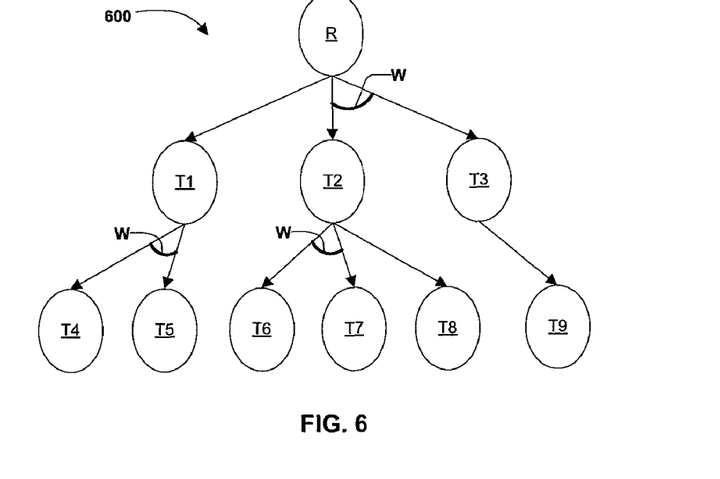
FIGS. 6, 7A, 7B, 8A and 8B are exemplary illustrations of how tasks are organized in the task's data structure, in accordance with one embodiment.

Referring to FIG. 1, a verification system may be implemented to determine whether a parallel computer program is being tested (100). If so, the system initializes a data structure for storing task data (102). In one embodiment, the data structure is implemented as a directed acyclic graph, herein referred to as a task tree 600 an exemplary embodiment of which is illustrated in FIG. 6. It is noteworthy that depending on implementation different types of data structures (e.g., tables, linked lists, arrays, etc.) may be utilized to construct said data structure, without detracting from the scope of the invention.

Figures 2A, 2B, 3:
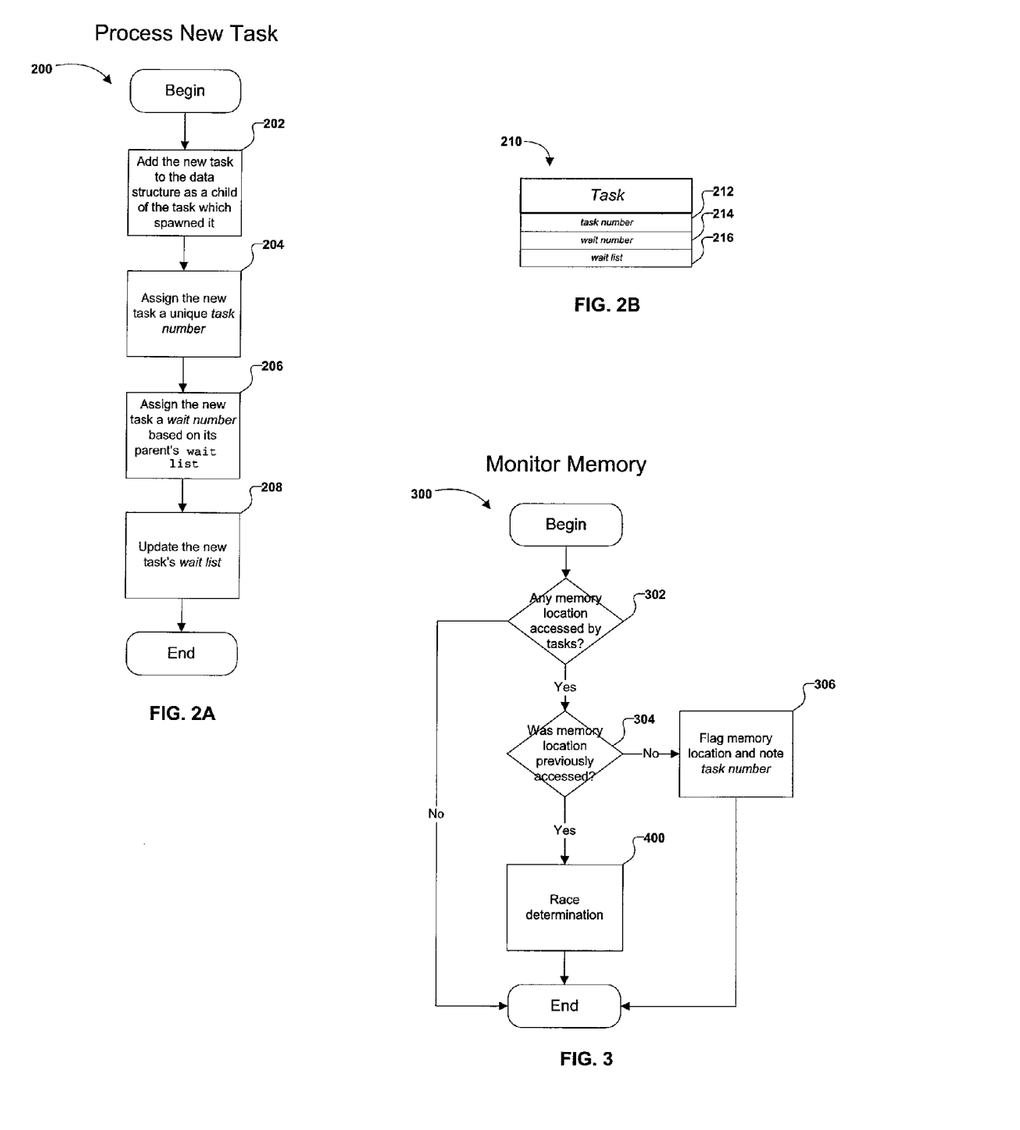
FIG. 2A is a flow diagram illustrating how new tasks are processed, in accordance with one embodiment.
FIG. 2B is a block diagram illustrating an exemplary task data structure, in accordance with one embodiment.
FIG. 3 is a flow diagram illustrating how memory locations are monitored, in accordance with one embodiment.

As shown in FIG. 2B, one or more processes executed in a concurrent execution environment may be represented by a task 210, illustrated by way of example as a data structure that stores several values associated with each task. A task may be assigned at least one of a task number 212, a wait number 214, and a wait list 216, for example. Each task may be represented by a node in the task tree 600 and, depending on the task's order of execution, each task 210 may be associated with a child or a parent node. A parent is a task that spawns one or more tasks (i.e., children).

The parent may wait for one or more of its children to finish executing before continuing its own execution. In one embodiment, this is accomplished by, for example, a wait instruction, meaning that it is undesirable for a parent to terminate before a certain number (e.g., all) of its children are dead. It should be noted that in the following exemplary embodiments the presence of a wait instruction is presumed as a synchronization construct. In other words, it is implicitly assumed that the parent executes a wait instruction at the end of its own execution. Thus, in certain but not all embodiments, each task 210 may be separated from other tasks by a wait instruction.

Task 210 can be thought of as being split into a number of logical segments, wherein a segment is a block of logic code separated by two wait instructions. These segments may be numbered in ascending or descending order, for example, depending on implementation. Each one of the tasks 210 may be assigned, desirably, a unique task number 212 based on the order in which it is spawned. Each one of the tasks may be also assigned a wait number 214 based on the segment number of the parent in which the task 210 was spawned. The task's 210 wait list 216 is a list of each of its ancestors' wait numbers 214. This information can be propagated at the time the task 210 is spawned by taking the wait list 216 of the task's 210 parent and adding the parent's wait number 214 to the task's wait list 216. Each one of the wait lists 216 may be represented by a vector, or other suitable data structure.

An example of a task tree 600 is shown in FIG. 6. Each node in the task tree 600 represents an individual task spawned by a thread executed in a multiprocessing environment. Thus, in the example illustrated in FIG. 6, a root task R has children tasks T1, T2, and T3. Tasks T2 and T3 are separated by a wait instruction W. Thus, root task R waits for tasks T1 and T2 to finish executing before spawning task T3. Task T1 has children tasks T4 and T5, separated by a wait instruction W. Thus, task T1 waits for task T4 to finish executing before spawning task T5. Task T2 has children tasks T6, T7, and T8, with a wait instruction W between tasks T6 and T7. Thus, task T2 waits for task T6 to finish executing before spawning tasks T7 and T8. Task T3 has a child task T9.

The ancestor-siblings of two unrelated tasks are the youngest ancestors of the two tasks which happen to be siblings. In other words, the ancestor-siblings are the children of the least common ancestor of the two tasks which dominate the tasks in question. As an example, in FIG. 6, tasks T1 and T2 are the ancestor-siblings of T4 and T8 respectively. In a certain embodiment, when a task begins executing, each of its descendents will execute before its sibling starts executing. Thus, in FIG. 6, tasks T1, T4, and T5 will execute before task T2 starts executing.

Referring back to FIG. 1, when it is determined that a new task 210 is spawned (104), the system processes the new task 210 (200). FIG. 2A is a flow diagram illustrating exemplary details involved in processing new tasks 210 in accordance with one or more embodiments. The system may generate a new node in the task tree 600 to represent a newly spawned task 210 and add the node as a child of the task 210 which spawned it (202). Desirably, the system assigns to the new task 210 a unique task number 212 (204). The system may also assign to the new task 210 a wait number 214 based on its parent's wait list 216 (206). The system then updates the new task's 210 wait list 216 (208).

Referring to FIGS. 1 and 3, the system monitors accesses to memory locations presently or previously allocated to one or more tasks (300). To accomplish this, the system determines whether a memory location is accessed by any of the tasks 210 (302). If so, the system determines whether that particular memory location has been previously accessed (304). In one embodiment, the system maintains an access list which comprises a list of all memory locations accessed in the multiprocessing execution environment, as well as the task numbers 212 of the tasks 210 which accessed the corresponding memory locations. When a memory location is accessed by a task 210, the system adds the memory location's address and the task number 212 to the access list (306). Thus, the system checks the address list in order to determine whether a particular memory location has been previously accessed by a different task 210. If the system determines that a particular memory location has been previously accessed by a different task 210, a race determination process is invoked (400) as provided in further detail with reference to FIG. 4.

Figure 4:
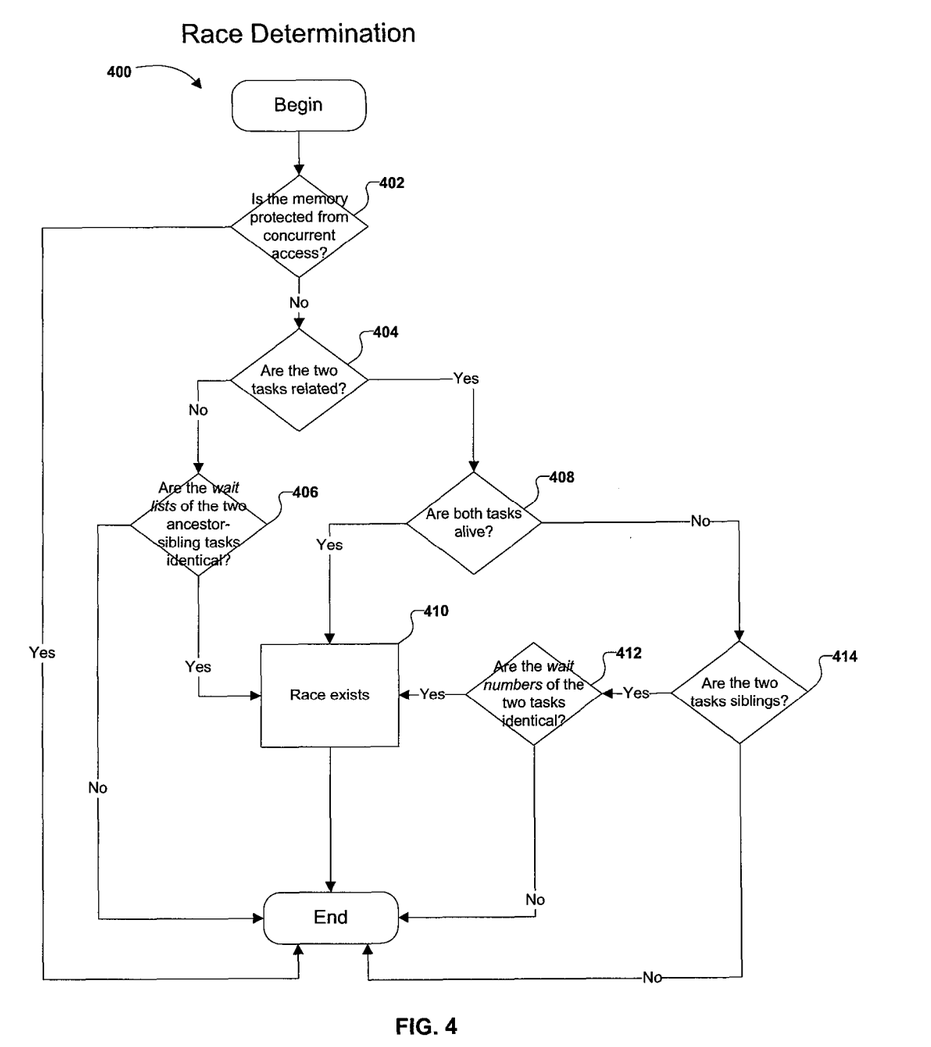
FIG. 4 is a flow diagram illustrating how race conditions are detected, in accordance with one embodiment.

Referring to FIG. 4, the system may be configured to determine whether a location in memory is protected from concurrent access by a first task (i.e., the task which accessed the memory location first) and the second task (i.e., the task which accessed the memory location second) (402). In an exemplary embodiment, a set of locks with a non-null intersection may be utilized to monitor memory access and protect a memory location from being accessed by more than one task at the same time, under certain conditions. A lock is a programming construct that allows one task 210 to take control of an object or variable (e.g., allocated to a memory location) and prevent other tasks 210 from reading or writing to it, until that object or variable is unlocked. One example of a lock is a wait instruction W inserted between the execution of the first and second tasks as provided here. It is noteworthy, however, that other methods of protecting memory from concurrent access may be utilized depending on implementation.

If the system determines that the memory is protected from concurrent access, then a possible conclusion may be that no data race exists between the first and second tasks. Otherwise the system determines whether the first task and the second task are related (404). Two tasks are considered to be related if, for example, they are siblings or if one is the ancestor of the other. If the first and second tasks are related, the system determines whether the two tasks are both alive (i.e., if the first and second tasks are still present in the task tree 600) (408). If the first and second task are both alive, then it may be determined that data race between the two tasks exists (410). The system may add the data race information to a validity report, for example. In one embodiment, the validity report may be created in the form of, for example, a text file, a vector or other type of data structure suitable for the noted purpose, depending on implementation.

If one of the first and second tasks 210 is no longer alive (i.e., if one of the first and second tasks 210 is no longer present in the task tree 600), then the system determines whether the first and second tasks 210 are siblings (414). If the two tasks 210 are not siblings, then no data race exists. However, if the two tasks 210 are siblings, then step 412 determines whether the wait numbers 214 of the first and second tasks 210 are identical. Based on the logic in which the task tree 600 is maintained, if two tasks 210 are siblings, then they can run in parallel if and only if their wait numbers 214 are identical. If the wait numbers 214 are identical, then a data race exists between the first and second tasks 210, and process 410 adds the data race information to the validity report. Otherwise, if the wait numbers 214 are not identical, then no data race exists.

Now referring back to FIG. 2B, if the first and second tasks are not related, the system determines whether the wait lists associated with the two ancestor-sibling tasks are substantially the same (406). Based on the exemplary logic in which the task tree 600 is maintained, two unrelated tasks can run in parallel if, for example, their ancestor siblings could have run in parallel (e.g., when the wait lists of the two ancestor-siblings are identical). If the wait lists 216 are substantially the same, then a data race may exist between the first and second tasks, and the system may add the data race information to a validity report. Otherwise, if the wait lists are not substantially the same, then the system may determine that no data race exists.

Depending on the size and complexity of a program under test, a significant amount of processing time may be needed to determine if two tasks are related. This is because the search for ancestor-siblings is directly dependent on the depth of the first and second tasks in the task tree 600. In addition, because each task may maintain a record of its ancestors (and associated data, including its wait list 216), the memory requirement for the implementation of process 400 has the potential to be large as well. Thus, when the system determines that a task has finished executing, in one embodiment the system is configured to optimize the task tree 600, thereby reducing potential processing time and memory space associated with process 400.

In one or more embodiments, to optimize task tree 600 two unrelated tasks may be compared to determine if they could have executed in parallel, by way of determining whether their ancestor-siblings could have executed in parallel. Thus, in certain embodiments, it may not be necessary to keep track of certain tasks once such tasks have been completed (i.e., dead). Instead, it may suffice to monitor and track the status of the ancestor-siblings, for example.

Figure 5:
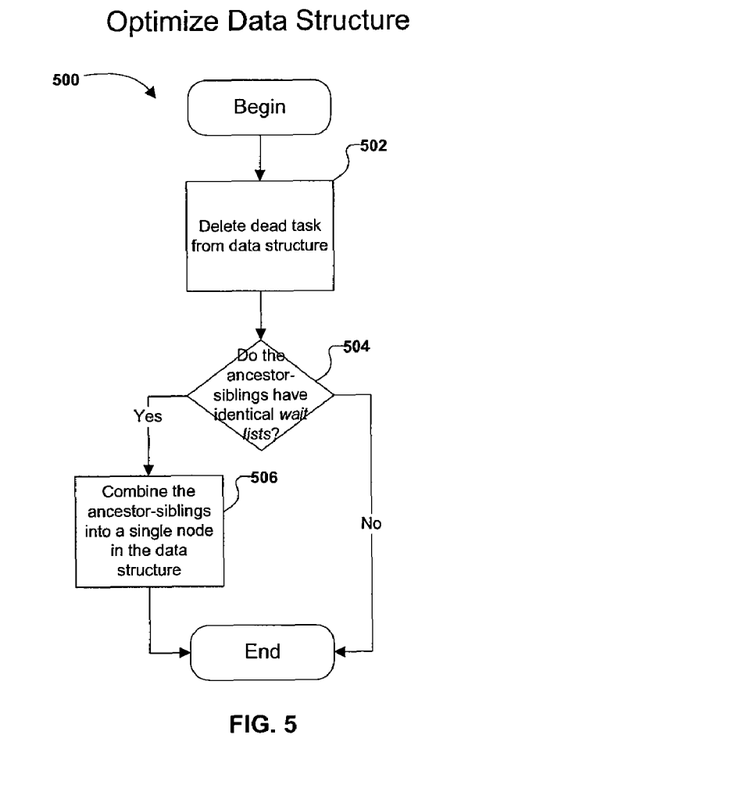
FIG. 5 is a flow diagram illustrating how a data structure for monitoring status of pending tasks is optimized, in accordance with one embodiment.
Figure 7A:
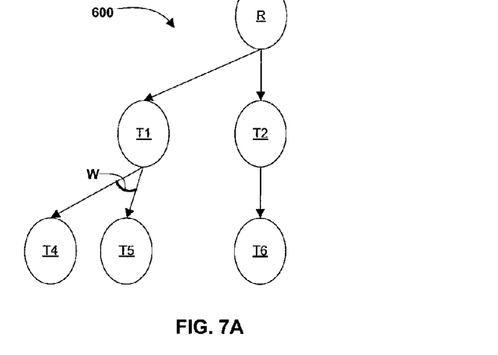
Figure 7B:
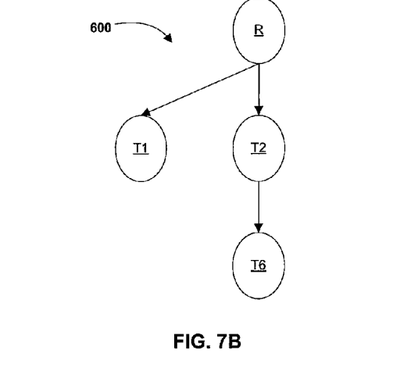

Referring to FIG. 5, an exemplary flowchart for optimizing the task tree 600 is provided. In one embodiment, the system detects and deletes dead tasks 210 from the task tree 600 (502). Thus, once a task 210 finishes execution, the task is deleted from the task tree 600. Since, in certain embodiments, a task 210 finishes executing after one or more (e.g., all) of its children have finished executing, dead tasks 210 will be leaf nodes in the task tree 600; accordingly, no nodes will be orphaned. FIGS. 7A and 7B illustrate an example that demonstrates the effect of node deletion on the task tree 600. After task T4 has finished executing, it is deleted from the task tree 600. In addition, after task T5 has finished executing, it is deleted from the task tree 600 as well. FIG. 7B shows the task tree 600 the system has deleted tasks T4 and T5. Thus, step 502 compresses the task tree 600 in the vertical direction.

Figure 8A:
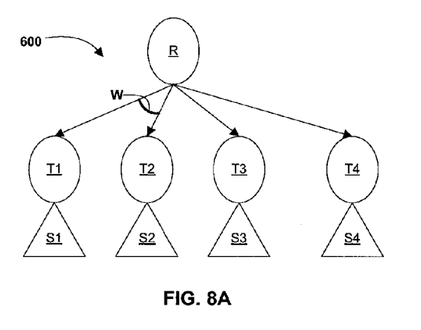
Figure 8B:
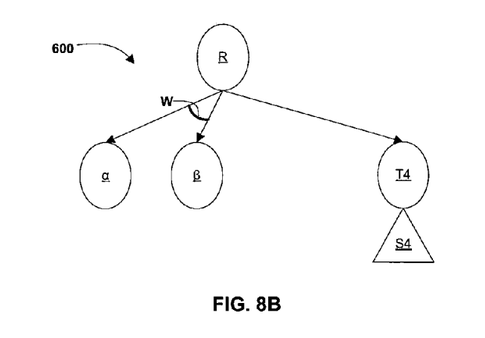

Referring back to FIG. 5, in one embodiment, the system determines whether any ancestor-siblings have identical or similar wait lists 216 (504). If any ancestor-siblings have identical or similar wait lists 216, then the system combines the ancestor-siblings into a single node in the task tree 600 (506). FIGS. 8A and 8B illustrate an example that demonstrates the above noted pruning effects on the task tree 600. In FIG. 8A, it is assumed that sub-trees S1, S2, and S3 (i.e., the descendents of tasks T1, T2, and T3 respectively) have finished executing and that sub-tree S4 rooted at task T4 is currently executing. In this example, it will be assumed that a task "x" (not shown) is executing in sub-tree S4 and accesses some memory location that was previously accessed by a task "y" (not shown) in one of sub-trees S2 or S3 (note that "x" could never run in parallel with any task in sub-tree S1 due to the wait instruction W).

To determine whether "x" and "y" could have run in parallel, the system will compare the wait lists of the ancestor-siblings of "x" and "y," which are tasks T4 and T2, or tasks T4 and T3, respectively. If tasks T2 and T3 have identical or similar wait lists, tasks T2 and T3 can be compressed into a single node β. The same compression may be performed on tasks that have finished executing before a wait instruction W. As shown in this example, the system has compressed task T1 into a single node α, and tasks T2 and T3 into a single node β. Thus, the task tree 600 is compressed in the horizontal direction by reducing the total number of tasks 210 at certain levels in the task tree 600.

The system may continue to operate and optimize task tree 600 in the manner provided above until one or more of the tasks 210 executing in the concurrent processing environment have finished executing (110). The system may determine if there are any tasks 210 still executing (114) and revert back to process 104, for example. Depending on implementation, the system may generate and display a validity report which lists the potential data races discovered (116).

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may be comprise one or more modules that execute on one or more processors in a distributed, non-distributed, or multiprocessing environment.

The method as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections of buried interconnections).

In any case, the chip is then integrated with other chips, discrete circuit elements, and/or other signal processing devices as part of either (a) an intermediate product, such as a motherboard, or (b) and an end product. The end product can be any product that includes integrated circuit chips, ranging from toys and other low-end applications to advanced computer products having a display, a keyboard or other input device, and a central processor.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A computer-implemented method comprising:
   processing a task in a multi-threaded computing environment, wherein the task includes multiple segments of code;
   representing the task as a node of a data structure;
   adding child nodes to the data structure to represent child tasks spawned by corresponding parent tasks;
   associating each added child node with a wait number based on a segment number of a corresponding parent node;
   associating each added child node with a corresponding wait list that includes a wait number of each of one or more lineal parent nodes of the added child node, wherein a lineal parent node corresponds to a task from which, or through which, a child task is spawned;
   identifying first and second tasks that access a memory location; and
   evaluating one or more of the following to determine whether the accesses to the memory location by the first and second tasks correspond to a data race to the memory location;
       wait numbers associated with first and second nodes corresponding to the first and second tasks, and
       wait lists associated with lineal parent nodes of the first and second nodes.

2. The method of claim 1, wherein the evaluating includes:
   determining that a race condition does not exist based at least in part on a determination that the wait numbers associated with the first and second nodes differ from one another.

3. The method of claim 1, wherein the evaluating includes:
   determining that a race condition does not exist when,
       execution of at least one of the first and second tasks is complete, the first and second tasks are spawned from a same parent task, and
       the wait numbers associated with the first and second nodes differ from one another.

4. The method of claim 1, wherein the evaluating includes:
   determining that a race condition does not exist based at least in part on a determination that the wait lists of the lineal parent nodes of the first and second nodes differ from one another.

5. The method of claim 1, wherein the evaluating includes:
   determining that a race condition does not exist when,
       the first and second tasks are not spawned by a same parent task,
       neither of the first and second nodes is a lineal parent node of the other of the first and second nodes, and
       the wait lists associated with the lineal parent nodes of the first and second nodes differ from one another,
       wherein the lineal parent nodes of the first and second nodes are child nodes of a same parent node.

6. The method of claim 1, wherein maintaining of the data structure includes:
   removing a node from the data structure when execution of a corresponding task is complete.

7. The method of claim 1, wherein maintaining of the data structure includes:
   identifying child nodes of a parent node for which execution of corresponding tasks are complete; and
   combining the identified child nodes into a single child node when wait lists associated with the identified child nodes are identical to one another.

8. The method of claim 1, wherein maintaining of the data structure includes:
   identifying a node for which a corresponding task maintains exclusive access to the memory location until processing of the corresponding task and associated child tasks is complete; and
   combining the identified node and corresponding child nodes into a single node.

9. A non-transitory computer readable medium encoded with a computer program, including instructions to cause a multi-threaded processor system to:
    process a task in a multi-threaded computing environment, wherein the task includes multiple segments of code;
    represent the task as a node of a data structure;
    add child nodes to the data structure to represent child tasks spawned by corresponding parent tasks;
    associate each added child node with a wait number based on a segment number of a corresponding parent node;
    associate each added child node with a corresponding wait list that includes a wait number of each of one or more lineal parent nodes of the added child node, wherein a lineal parent node corresponds to a task from which, or through which, a child task is spawned;
    identify first and second tasks that access a memory location; and
    evaluate one or more of the following to determine whether the accesses to the memory location by the first and second tasks correspond to a data race to the memory location:
        wait numbers associated with first and second nodes corresponding to the first and second tasks, and
        wait lists associated with lineal parent nodes of the first and second nodes.

10. The computer readable medium of claim 9, wherein the instructions include instructions to cause the multi-threaded processor system to:
    determine that a race condition does not exist based at least in part on a determination that the wait numbers associated with the first and second nodes differ from one another.

11. The computer readable medium of claim 9, wherein the instructions include instructions to cause the multi-threaded processor system to:
    determine that a race condition does not exist when,
        execution of at least one of the first and second tasks is complete,
        the first and second tasks are spawned from a same parent task, and
        the wait numbers associated with the first and second nodes differ from one another.

12. The computer readable medium of claim 9, wherein the instructions include instructions to cause the multi-threaded processor system to:
    determine that a race condition does not exist based at least in part on a determination that the wait lists of the lineal parent nodes of the first and second nodes differ from one another.

13. The computer readable medium of claim 9, wherein the instructions include instructions to cause the multi-threaded processor system to:
    determine that a race condition does not exist when,
        the first and second tasks are not spawned by a same parent task,
        neither of the first and second nodes is a lineal parent node of the other of the first and second nodes, and
        the wait lists associated with the lineal parent nodes of the first and second nodes differ from one another, wherein the lineal parent nodes of the first and second nodes are child nodes of a same parent node.

14. The computer readable medium of claim 9, wherein the instructions include instructions to cause the multi-threaded processor system to:
    remove a node from the data structure when execution of a corresponding task is complete.

15. The computer readable medium of claim 9, wherein the instructions include instructions to cause the multi-threaded processor system to:
    identify child nodes of a parent node for which execution of corresponding tasks are complete; and
    combine the identified child nodes into a single child node when wait lists associated with the identified child nodes are identical to one another.

16. The computer readable medium of claim 9, wherein the instructions include instructions to cause the multi-threaded processor system to:
    identify a node for which a corresponding task maintains exclusive access to the memory location until processing of the corresponding task and associated child tasks is complete; and
    combine the identified node and corresponding child nodes into a single node.

17. A system, comprising:
    a multi-threaded processor system including memory;
    a non-transitory computer readable medium encoded with a computer program, including instructions to cause the multi-threaded processor system to:
        process a task in a multi-threaded computing environment, wherein the task includes multiple segments of code;
        represent the task as a node of a data structure;
        add child nodes to the data structure to represent child tasks spawned by corresponding parent tasks;
        associate each added child node with a wait number based on a segment number of a corresponding parent node;
        associate each added child node with a corresponding wait list that includes a wait number of each of one or more lineal parent nodes of the added child node, wherein a lineal parent node corresponds to a task from which, or through which, a child task is spawned;
        identify first and second tasks that access a memory location; and
        evaluate one or more of the following to determine whether the accesses to the memory location by the first and second tasks correspond to a data race to the memory location:
            wait numbers associated with first and second nodes corresponding to the first and second tasks, and
            wait lists associated with lineal parent nodes of the first and second nodes.

18. The system of claim 17, wherein the instructions include instructions to cause the multi-threaded processor system to determine that a race condition does not exist when,
    execution of at least one of the first and second tasks is complete,
    the first and second tasks are spawned from a same parent task, and
    the wait numbers associated with the first and second nodes differ from one another.

19. The system of claim 17, wherein the instructions include instructions to cause the multi-threaded processor system to determine that a race condition does not exist when,
    the first and second tasks are not spawned by a same parent task,
    neither of the first and second nodes is a lineal parent node of the other of the first and second nodes, and
    the wait lists associated with the lineal parent nodes of the first and second nodes differ from one another, wherein the lineal parent nodes of the first and second nodes are child nodes of a same parent node.

20. The system of claim 17, wherein the instructions include instructions to cause the multi-threaded processor system to:
- identify child nodes of a parent node for which execution of corresponding tasks are complete;
- combine the identified child nodes into a single child node when wait lists associated with the identified child nodes are identical to one another;
- identify a node for which a corresponding task maintains exclusive access to the memory location until processing of the corresponding task and associated child tasks is complete;
- combine the identified node and corresponding child nodes into a single node; and
- remove a node from the data structure when execution of a corresponding task is complete.

* * * * *

UNITED STATES PATENT AND TRADEMARK OFFICE
CERTIFICATE OF CORRECTION

PATENT NO. : 8,141,082 B2
APPLICATION NO. : 12/039528
DATED : March 20, 2012
INVENTOR(S) : Gautam Upadhyaya et al.

It is certified that error appears in the above-identified patent and that said Letters Patent is hereby corrected as shown below:

In column 8, line 17, in claim 1, delete "location;" and insert -- location: --, therefor.

Signed and Sealed this
Second Day of October, 2012

David J. Kappos
*Director of the United States Patent and Trademark Office*